T. HARRISON & W. C. BUCHANAN.
Thrashing-Machine.

No. 160,320. Patented March 2, 1875.

UNITED STATES PATENT OFFICE.

THEOPHILUS HARRISON AND WILLIAM C. BUCHANAN, OF BELLEVILLE, ILL.

IMPROVEMENT IN THRASHING-MACHINES.

Specification forming part of Letters Patent No. 160,320, dated March 2, 1875; application filed December 5, 1874.

*To all whom it may concern:*

Figure 1:
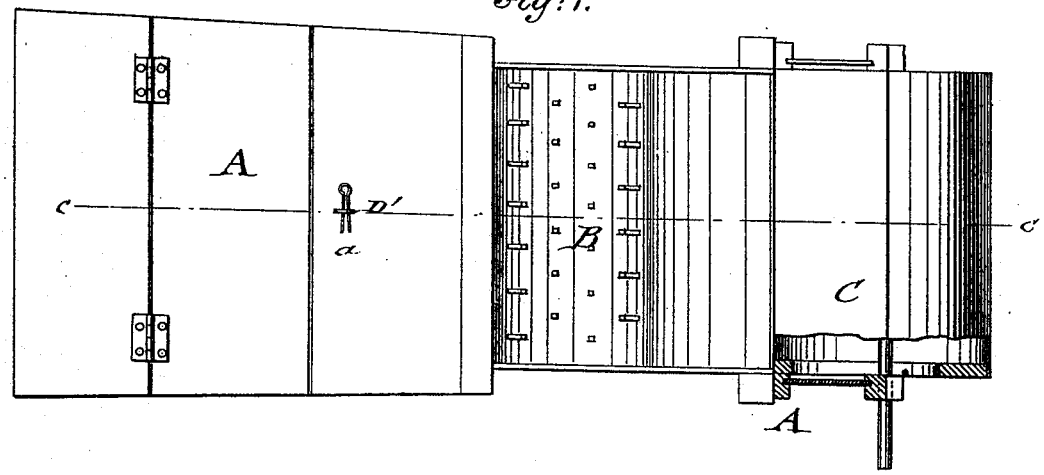
Figure 2:
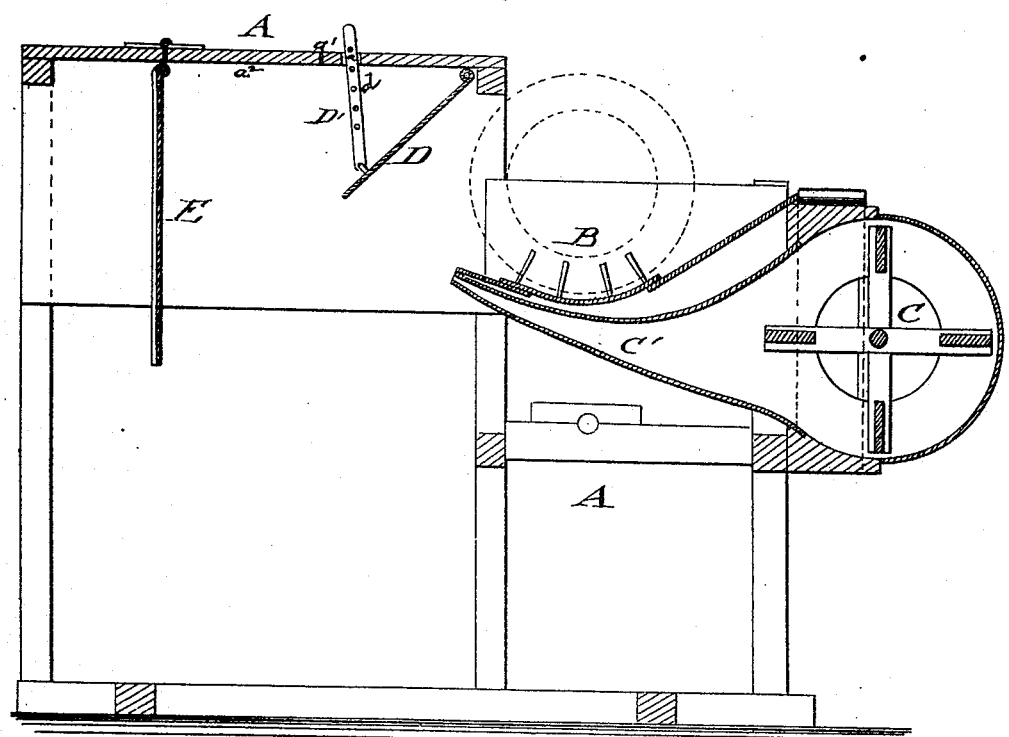

Be it known that we, T. HARRISON and W. C. BUCHANAN, of Belleville, St. Clair county, Illinois, have invented an Improvement in Thrashers, that also clean the grain from the chaff and throw it on a vibrator or endless apron, of which the following is a specification:

Figure 1 of the drawing represents a top view; Fig. 2, a vertical longitudinal section.

The invention will first be fully described, and then pointed out in the claim.

C represents a fan, and C' a tapering blast-channel, the latter under the thrashing-concave B. The blast thus strikes the wheat, chaff, and straw as they pass from thrasher, hoisting the chaff through an opening, $a^2$. D is a hinged door at the outlet of thrasher, made adjustable by rod D', fastened to top by pin $a$ passing through one of its holes, $d$.

This deflects the grain, and causes it to fall on the ordinary vibrator. E is a plate hinged and pendent from the frame A, the same being placed some distance in front of the one D, for the purpose of preventing the ejection of loose grain. $a^1$ is a hinged or trap door that covers the aperture $a^2$ or chaff-escape.

Having thus described all that is necessary to a full understanding of my invention, what I claim is—

The combination, with the fan C, having tapering channel C', of the hinged plates D and E, all arranged, with respect to concave B and opening $a^2$, substantially as and for the purpose specified.

THEOPHILUS HARRISON.
WILLIAM C. BUCHANAN.

Witnesses:
GEO. H. STOLBERG,
GEO. W. SCHUESSLER.